US012234745B1

(12) United States Patent
Kray et al.

(10) Patent No.: US 12,234,745 B1
(45) Date of Patent: Feb. 25, 2025

(54) VARIABLE PITCH AIRFOIL

(71) Applicant: GENERAL ELECTRIC COMPANY, Schenectady, NY (US)

(72) Inventors: Nicholas Joseph Kray, Mason, OH (US); Daniel E. Mollmann, Colerain Township, OH (US); Elzbieta Kryj-Kos, Liberty Township, OH (US); Arthur William Sibbach, Boxford, MA (US); Brent Michael Push, Blue Ash, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/386,867

(22) Filed: Nov. 3, 2023

(51) Int. Cl.
*F01D 5/30* (2006.01)
*F01D 7/00* (2006.01)

(52) U.S. Cl.
CPC ................. *F01D 5/30* (2013.01); *F01D 7/00* (2013.01); *F05D 2250/283* (2013.01); *F05D 2260/70* (2013.01)

(58) Field of Classification Search
CPC .......... F01D 5/30; F01D 7/00; F05D 2260/70; F05D 2250/283
See application file for complete search history.

(56) References Cited

U.S. PATENT DOCUMENTS

| | | | | | |
|---|---|---|---|---|---|
| 2,727,716 | A * | 12/1955 | Bertra | F01D 5/30 | 416/221 |
| 3,291,382 | A * | 12/1966 | Vaughau | F04D 29/542 | 415/217.1 |
| 4,019,832 | A * | 4/1977 | Salemme | F01D 11/008 | 416/135 |
| 5,281,096 | A * | 1/1994 | Harris | F01D 11/008 | 416/193 A |
| 5,282,720 | A | 2/1994 | Szpunar | | |
| 6,692,227 | B2 | 2/2004 | Tomita et al. | | |
| 8,851,854 | B2 | 10/2014 | Alexander | | |
| 10,145,039 | B2 | 12/2018 | Marchal et al. | | |
| 10,724,159 | B2 | 7/2020 | Marchal et al. | | |
| 11,092,021 | B2 | 8/2021 | Theertham | | |
| 11,168,572 | B2 | 11/2021 | Lyders et al. | | |
| 2023/0059995 | A1 * | 2/2023 | Geertsema | F01D 25/04 | |
| 2023/0220782 | A1 | 7/2023 | Duchatelle et al. | | |

* cited by examiner

*Primary Examiner* — Topaz L. Elliott
*Assistant Examiner* — Andrew J Marien
(74) *Attorney, Agent, or Firm* — McGarry Bair PC

(57) ABSTRACT

An airfoil assembly for a turbine engine, the airfoil assembly including a platform defining an inner surface and an outer surface, a variable pitch airfoil extending radially from the outer surface of the platform from a root to a tip to define a span length and a mounting structure connected to the platform.

20 Claims, 10 Drawing Sheets

VARIABLE PITCH AIRFOIL

TECHNICAL FIELD

The disclosure generally relates to an airfoil assembly, and more specifically to an airfoil assembly with a variable pitch airfoil.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blade and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
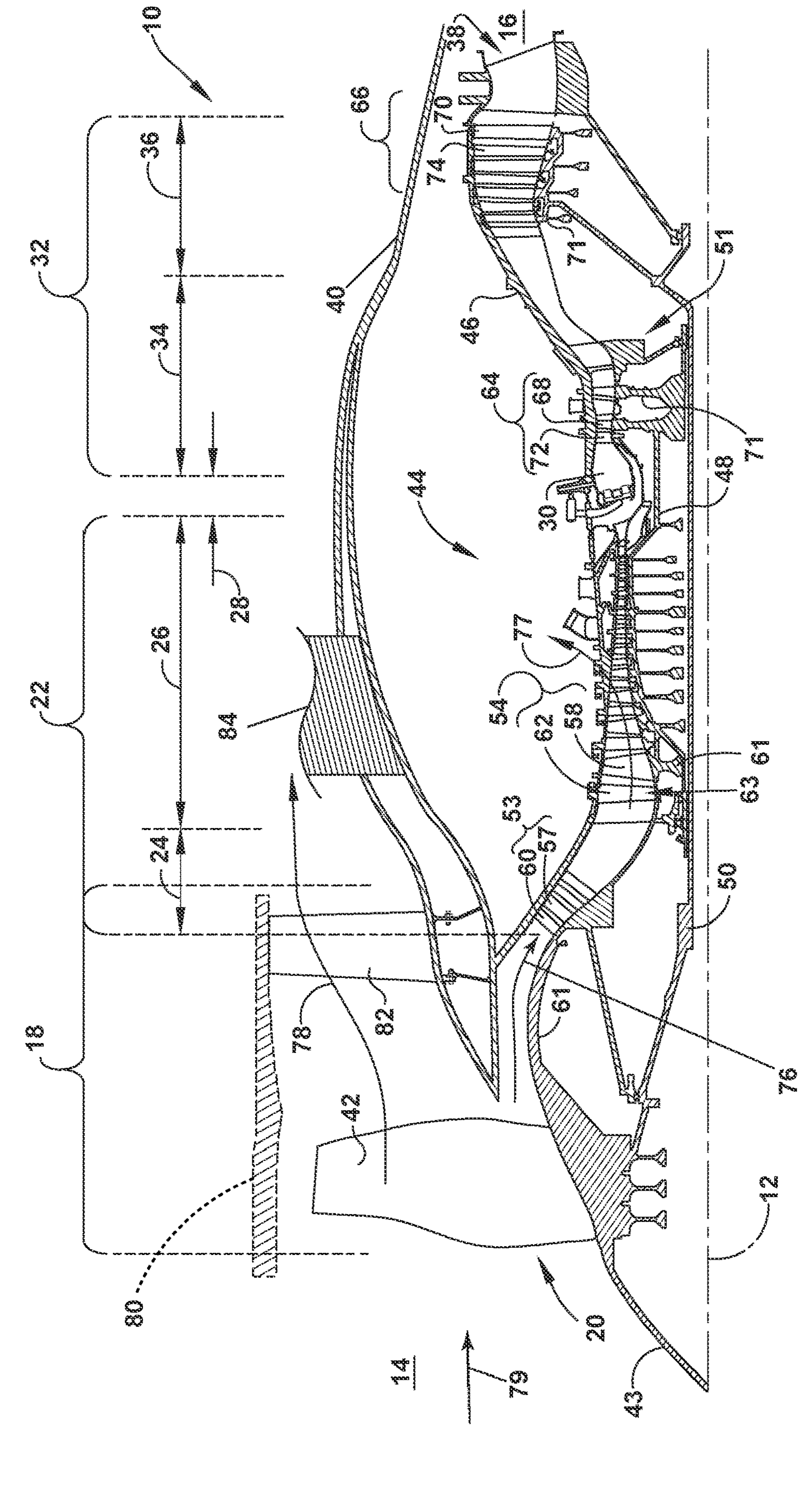
FIG. 1 is a schematic cross-sectional view of a turbine engine.

Aspects of the disclosure herein are directed to a turbine engine including an airfoil assembly with a mounting structure and a yielding interface. The airfoil assembly can be used at one or more locations within the turbine engine. For example, the airfoil assembly is suitable as a fan blade in a fan section of a turbine engine. Other locations, such as the compressor section and turbine section are contemplated. The airfoil assembly can be mounted in a variety of ways. One such mounting is securing the blades to a spinner of the fan section, directly, or via a pitch control assembly.

The yielding interface of the airfoil assembly is formed to enable yielding in a plurality of directions. The term yielding is used in this application to describe deflection which may or may not result in plastic deformation. In some applications, the yielding interface deflects to reduce load but does not plastically deform. The yielding interface described herein has been developed from tests and simulation analyses covering the ingestion of birds of varying sizes at varying span positions. The yielding interface described herein helps to mitigate incipient damage due to bird strike as well as ice impact, foreign object debris (FOD) strike, and even fan blade out debris strike.

This yielding can be enabled by forming the yielding interface from a honeycomb structure, a spring, or material having variable stiffness. Several embodiments for enabling yielding such that the airfoil assembly can withstand high mechanical stresses associated with the operation of the turbine engine while providing lightweight construction are discussed herein. For purposes of illustration, the present disclosure will be described with respect to an airfoil assembly for a turbine engine, specifically an airfoil assembly provided within a fan section of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications. Further, aspects of this disclosure will be directed towards a composite blade assembly including a mounting structure. It will be appreciated that aspects of this disclosure are directed towards any airfoil assembly. Further the airfoil assembly is not limited and could be a composite blade assembly or a composite vane assembly.

As used herein, the term “upstream” refers to a direction that is opposite the fluid flow direction, and the term “downstream” refers to a direction that is in the same direction as the fluid flow. The term “fore” or “forward” means in front of something and “aft” or “rearward” means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set of elements" can be any number of elements, including only one.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), metal matrix composite (MMC), carbon fiber, polymeric resin, thermoplastic, bismaleimide (BMI), polyimide materials, epoxy resin, glass fiber, and silicon matrix materials.

FIG. 1 is a schematic cross-sectional diagram of a turbine engine 10 for an aircraft. By way of non-limiting example the turbine engine 10 is illustrated as an open rotor turbine engine. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42. The set of fan blades 42 are mounted to a spinner 43 rotatable about the engine centerline 12. A set of outlet guide vanes (OGV) 82 is located downstream from the set of fan blades 42, both disposed radially about the engine centerline 12. The turbine engine 10 includes any number of one or more sets of rotating blades or propellers (e.g., the set of fan blades 42) disposed upstream of a set of stationary fan vanes (e.g., the set of OGVs 82). As a non-limiting example, the turbine engine 10 can include multiple sets of rotating blades and stationary vanes. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28. In some aspects of the disclosure herein, the turbine engine can include a fan casing 80 (shown in dotted line) surrounding the fan 20 to define a ducted turbine engine.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP spool 48 and the LP spool 50 are rotatable about the engine centerline 12 and couple to a set of rotatable elements, which collectively define a rotor 51.

It will be appreciated that the turbine engine 10 is either a direct drive or an integral drive engine utilizing a reduction gearbox coupling the LP shaft or spool 50 to the fan 20.

The LP compressor 24 and the HP compressor 26, respectively, include a set of compressor stages 53, 54, in which a set of compressor blades 57, 58 rotate relative to a corresponding set of static compressor vanes 60, 62 (also called a nozzle) to compress or pressurize the stream of fluid passing through the stage. In a single compressor stage 53, 54, multiple compressor blades 57, 58 are provided in a ring and extend radially outward relative to the engine centerline 12, from a blade platform to a blade tip, while the corresponding static compressor vanes 60, 62 are positioned upstream of and adjacent to the compressor blades 57, 58. It is noted that the number of blades, vanes, and compressor stages shown in FIG. 1 were selected for illustrative purposes only, and that other numbers are possible.

The compressor blades 57, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outward relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are mounted to the engine casing 46 in a circumferential arrangement. The compressor blades 57, 58 and the turbine blades 68, 70 described herein can be part of a blisk, rather than being mounted to a disk.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated portion. For example, the nacelle 40 extends axially forward such that a portion of the nacelle 40 overlays or covers a portion of the fan section 18 or a booster section (not illustrated) of the turbine engine 10. A pylon 84 mounts the turbine engine 10 to an exterior structure (e.g., a fuselage of an aircraft, a wing, a tail wing, etc.).

During operation of the turbine engine 10, a freestream airflow 79 flows against a forward portion of the turbine engine 10. A portion of the freestream airflow 79 becomes an inlet airflow 78. The inlet airflow 78 flows through the set of fan blades 42 and over the nacelle 40 of the turbine engine 10. Subsequently, the inlet airflow 78 flows over at least a portion of the set of OGVs 82, which directs the inlet airflow 78 such that it is transverse toward the engine centerline 12. The inlet airflow 78 then flows past the set of OGVs 82, following the curvature of the nacelle 40 and toward the exhaust section 38.

A portion of the freestream airflow 79 enters the engine core 44 after flowing through the set of fan blades 42 and is described as a working airflow 76, which is used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
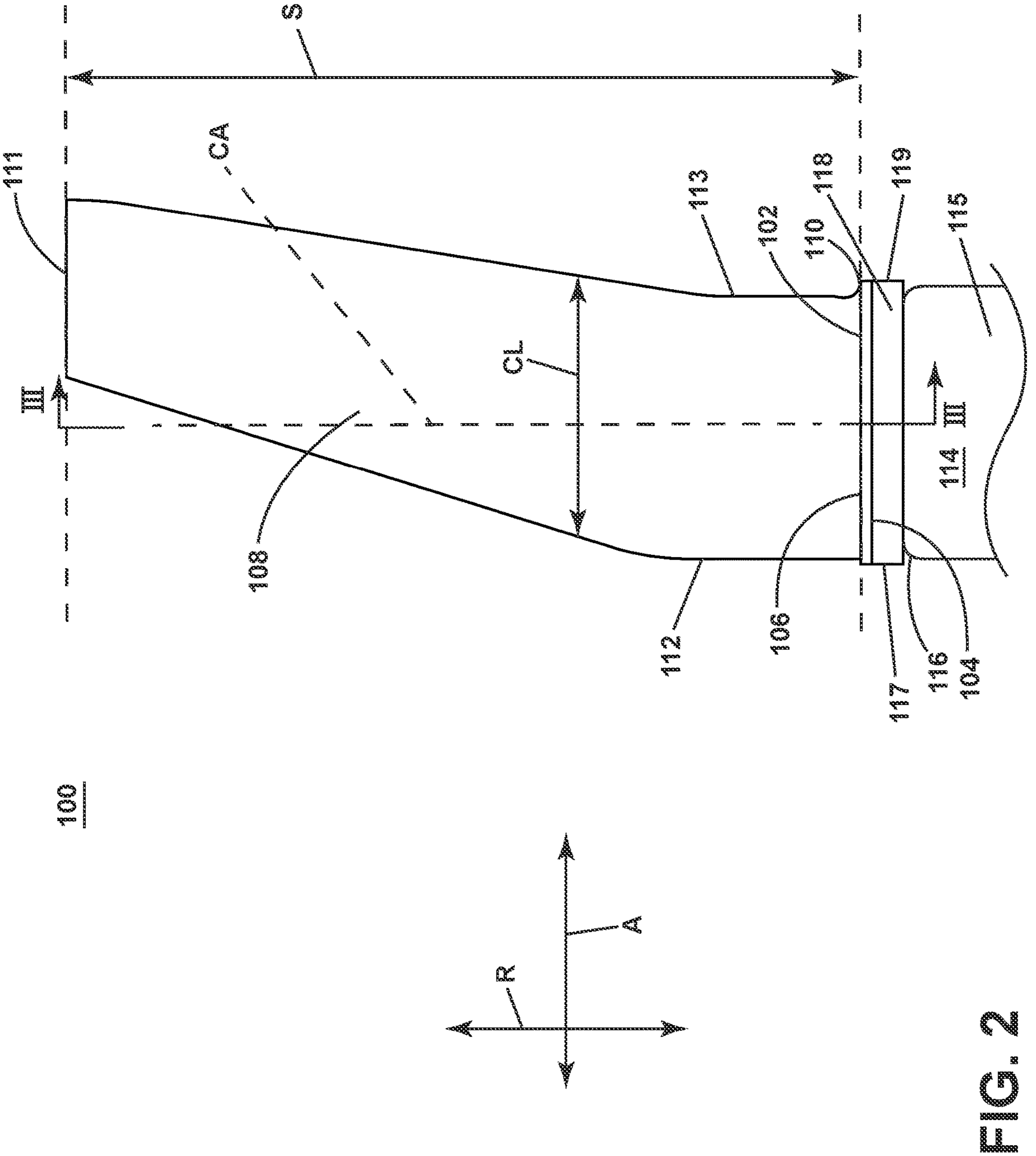
FIG. 2 is a schematic profile view of an airfoil assembly with a mounting structure and a yielding interface.

FIG. 2 is a schematic profile view of an airfoil assembly 100. In one non-limiting example the airfoil assembly 100 defines the set of blades 42 (FIG. 1). The airfoil assembly 100 includes a platform 102 having an inner surface 104 and an outer surface 106. An airfoil 108 extends from the outer surface 106 in a radial direction (denoted “R”). In one aspect the airfoil 108 is a fixed airfoil 109, where the platform 102 is fixed at a circumferential position with respect to the engine centerline 12. More specifically, the airfoil 108 can be a fixed variable pitch airfoil having an angle of attack (FIG. 5) that varies as the airfoil 108 extends from a root 110 to a tip 111 to define a span length (denoted “S”). A central axis (denoted “CA”) extends through a center point (denoted “P”) (FIG. 5) of the airfoil 108 at the root 110. The airfoil 108 extends between an airfoil leading edge 112 and an airfoil trailing edge 113 to define a chord length (denoted “CL”).

A mounting structure 114 suitable for attaching the airfoil 108 for operation can be any suitable mounting structure defining a hub 115 including the spinner 43 in the fan section 18. In another non-limiting example, the mounting structure 114 is one of the disks 61, 71 (FIG. 1) described herein. The mounting structure 114 has a curved mounting surface 116 annular about the engine centerline 12 (FIG. 1).

A yielding interface 118 is sandwiched between the platform inner surface 104 and the curved mounting surface 116. The yielding interface 118 is affixed to the platform 102. The yielding interface 118 is formed to enable yielding in a plurality of directions between the platform 102 and the mounting structure 114. The yielding interface 118 extends between an interface leading edge 117 and an interface trailing edge 119 to define an axial direction (denoted “A”) perpendicular to the radial direction R.

Figure 3:
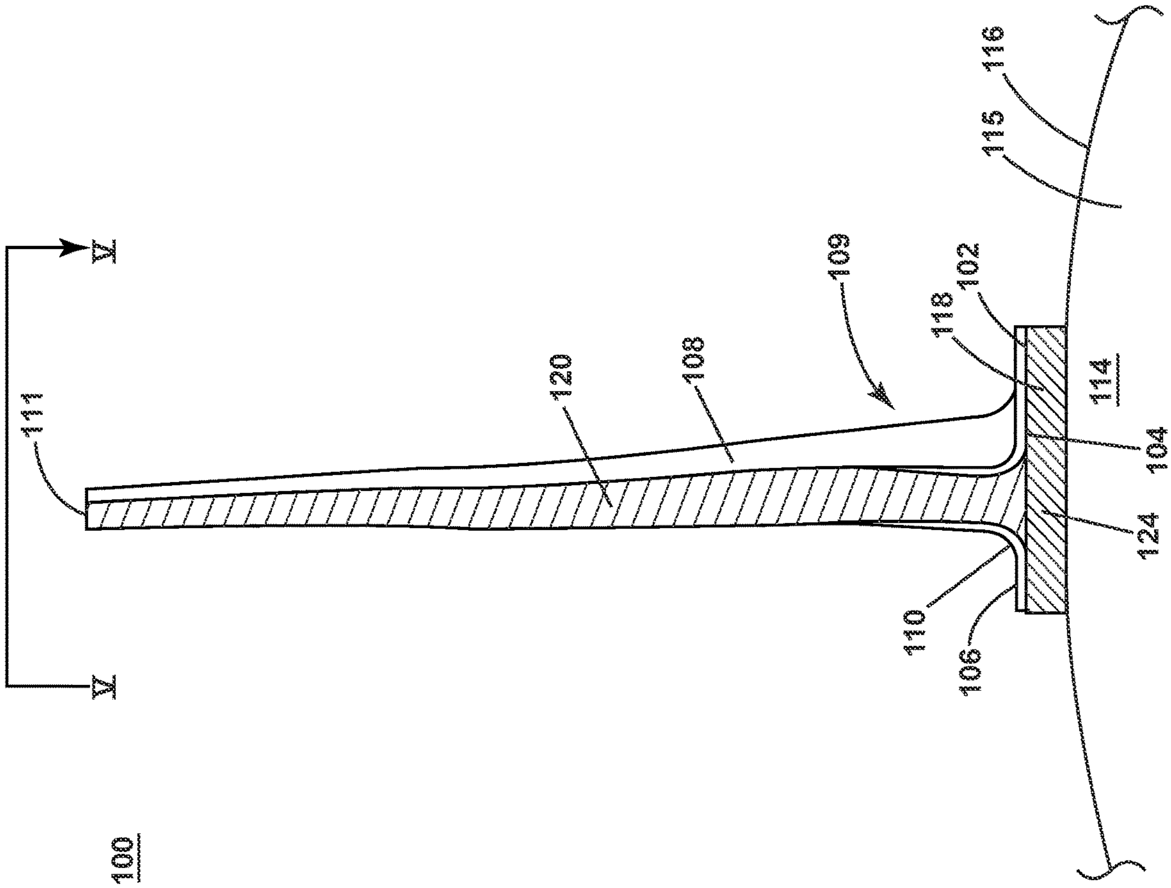
FIG. 3 is a cross-sectional view of the airfoil assembly of FIG. 2 taken along line III-III of FIG. 2.

FIG. 3 is a cross-sectional perspective view of the airfoil assembly 100 taken along line III-III of FIG. 2. The airfoil 108 includes a core 120. The yielding interface 118 is a crushable interface 124. The crushable interface 124 is formed from a material suitable for deforming under a given target torque load. The target torque load can range from 60,000 lbf-in to 100,000 lbf-in (6779 Nm to 11298 Nm). By way of example, the given target torque load is 80,000 lbf-in (9039 Nm). The crushable interface 124 can be defined by a honeycomb ribbon material or an additive matrix. The honeycomb ribbon material can be a weaker material than the surrounding structure that will buckle during high loading rates. The additive matrix can be an auxetic structure where when stretched, it will thicken and when compressed, it will shrink.

Figure 4:
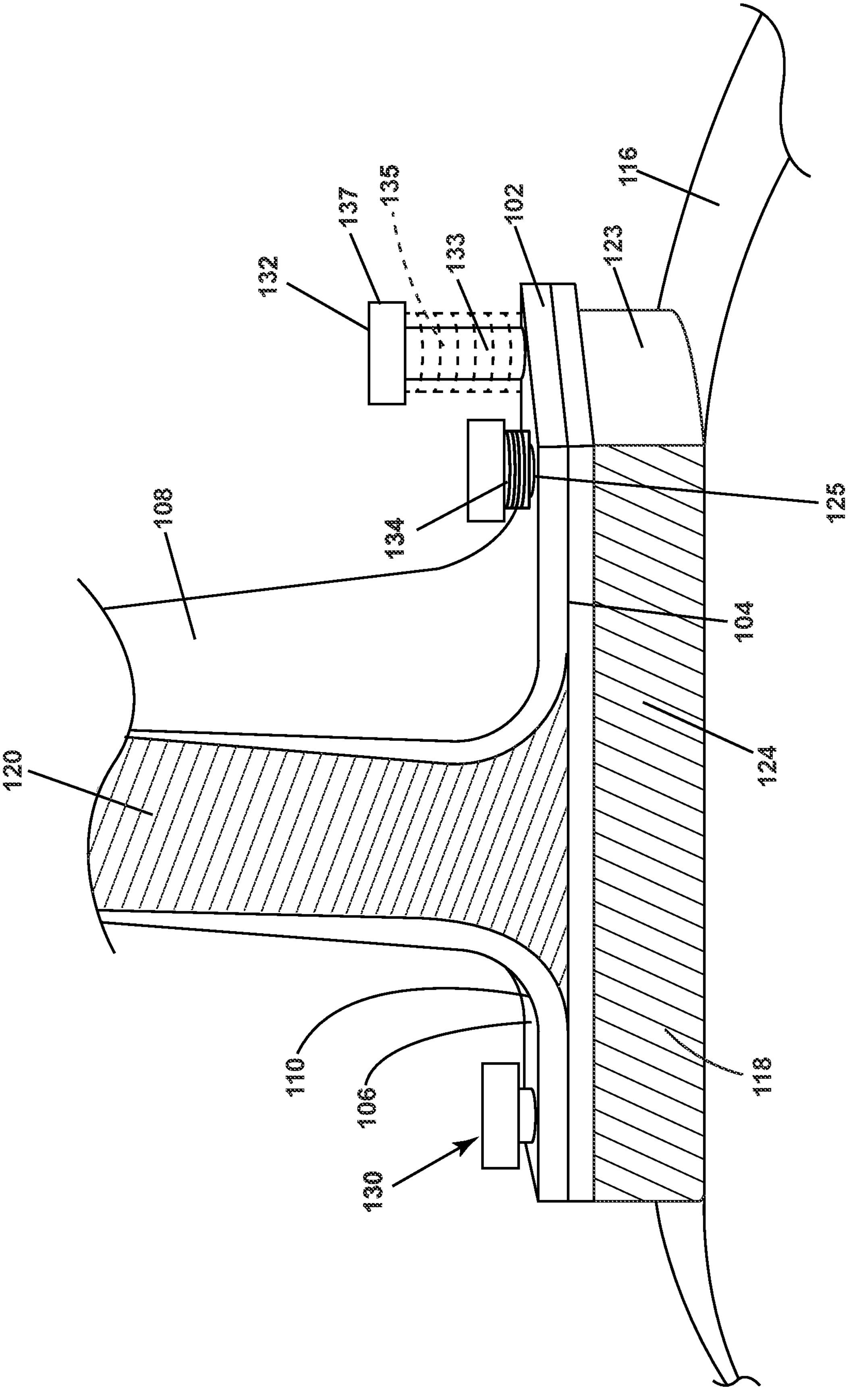
FIG. 4 is a cross-sectional perspective view of the yielding interface of FIG. 3 and a set of bolts for mounting the mounting structure to the yielding interface according to another aspect of the disclosure herein.

FIG. 4 is an enlarged cross-sectional perspective view of the airfoil assembly 100. In one aspect the crushable interface 124 is affixed to the platform 102 by a set of bolts 130. The platform 102 includes at least one bolt hole 125 for receiving the set of bolts 130. The at least one bolt hole 125 can be chamfered. The crushable interface 124 can be formed as a disc 123. At least one bolt 132, by way of non-limiting example two bolts, in the set of bolts 130 includes a crushable bolt spacer 134. The crushable bolt spacer 134 can be a washer or a sleeve enveloping a bolt shaft 133 of the at least one bolt 132. Before tightening the at least one bolt 132, the crushable bolt spacer 134 is in an expanded position, illustrated in dashed line 135, extending along the bolt shaft 133 between a bolt head 137 and the platform 102. When the at least one bolt 132 is tightened down, the crushable bolt spacer 134 deforms and is held between the platform 102 and a bolt head 137. The crushable bolt spacer 134 is formed from a yielding material, by way of non-limiting example a metal foam or a metal or composite lattice. Similarly, to the yielding interface 118, the crushable bolt spacer 134 is made from a material suitable for deforming under the given load.

Figure 5:
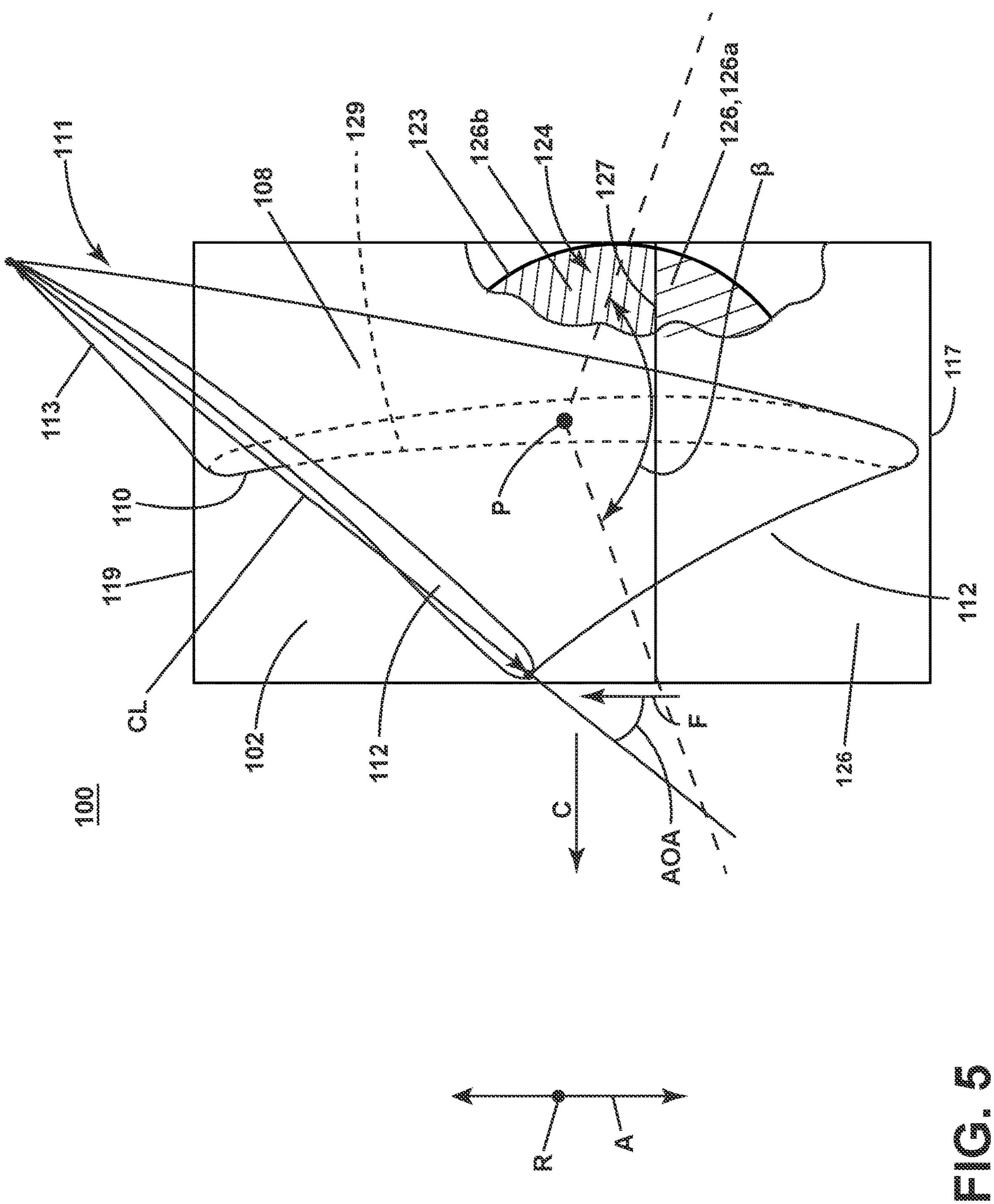
FIG. 5 is a schematic top-down view of the airfoil assembly of FIG. 2 taken from line V-V of FIG. 3.

FIG. 5 is a top-down view of the airfoil assembly 100 from line V-V of FIG. 3. The airfoil assembly 100 is circumferentially arranged about the engine centerline 12 (FIG. 1). A circumferential direction (denoted "C") is perpendicular to both the radial direction R and the axial direction A. Air moves through the turbine engine 10 (FIG. 1) in a flow direction (denoted "F") generally parallel to the axial direction A. An angle of attack (denoted "AOA") is the angle measurement between the circumferential direction C and the flow direction F.

The airfoil 108 is a variable pitch airfoil 111 in that it is rotatable about the center point P. In one aspect, the amount of rotation is within an arc (denoted "B") defined as between 20° and 160° with respect to the circumferential direction C and point P. A footprint 129 of where the airfoil 108 meets the platform 102 at the root 110 is illustrated in dashed line. It can more clearly be seen that the variable pitch airfoil 111 is has a changing angle of attack AOA as the airfoil 108 rotates about the center point P, and in turn the central axis CA (FIG. 2).

In one aspect the crushable interface 124 includes multiple crushable regions 126, by way of non-limiting example a first crushable region 126*a* and a second crushable region 126*b*, though any number of crushable regions 126 is contemplated. While the crushable regions 126 are illustrated as being separated by a border 127 running parallel to the circumferential direction C, it should be understood that the border 127 could be curved or angled. The crushable regions 126 have variable stiffness each having different hardness levels. Materials with variable stiffness could be implemented by using lattice cell structures having different sizes. Varying a metal to void ratio by volume of a metal foam can also vary the stiffness. Further, different base materials can be utilized for the metal foam such as stainless steel, aluminum, titanium, etc. The lattice cell structures could also be formed in a cubic cell structure, or a hexagonal cell structure, or could implemented as an auxetic lattice structure.

Figure 6:
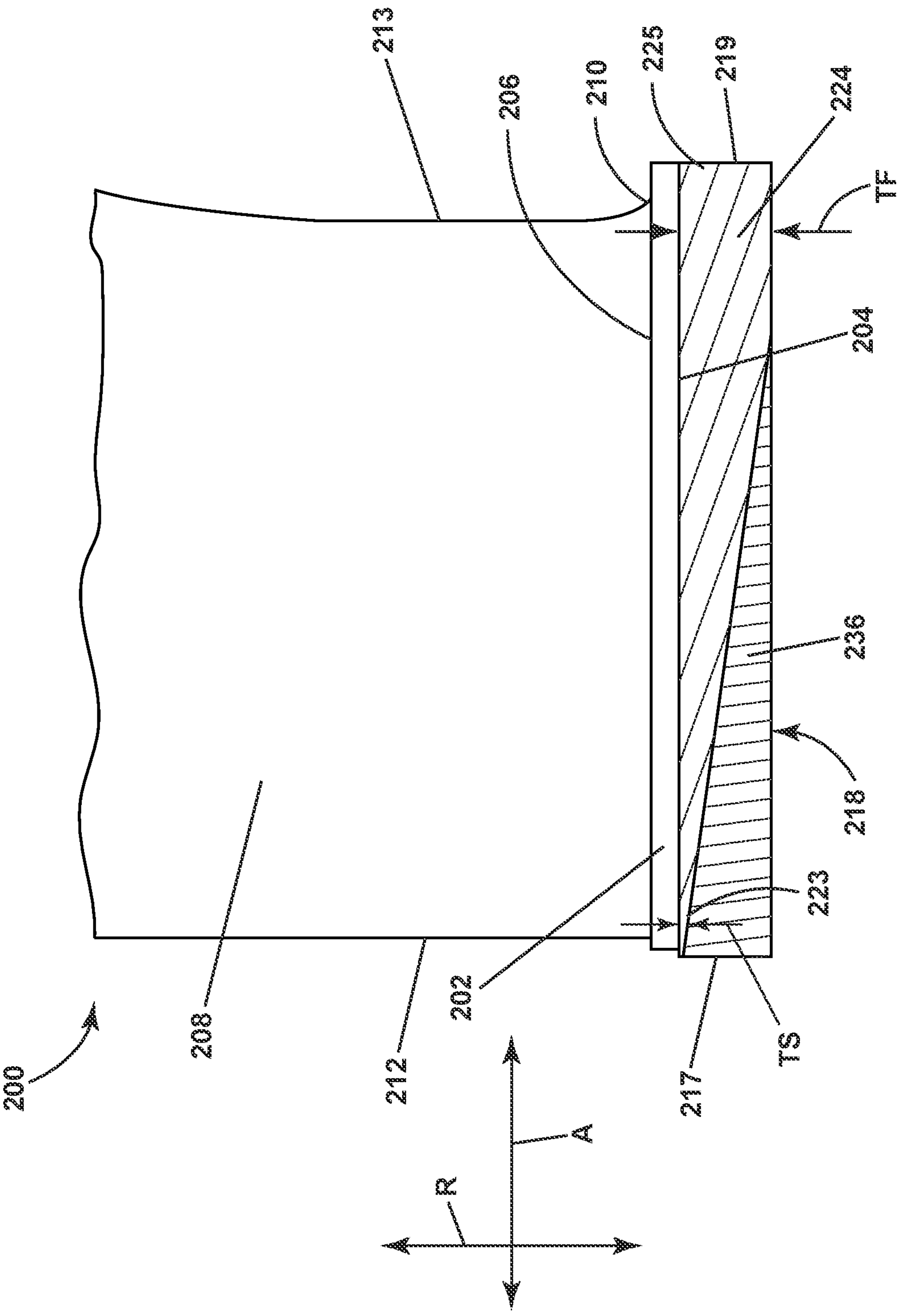
FIG. 6 is a cross-sectional view of another embodiment of a yielding interface suitable for the airfoil assembly of FIG. 2 according to another aspect of the disclosure herein.

FIG. 6 is a cross-sectional view of a yielding interface 218 according to another aspect of the disclosure herein. The yielding interface 218 is provided within an airfoil assembly 200 substantially similar to the airfoil assembly 100 of FIGS. 2-5, therefore, like parts will be identified with like numerals increased by 100. It should be understood that the description of the like parts of the yielding interface 118 applies to the yielding interface 218 unless otherwise noted.

The airfoil assembly 200 includes a platform 202 having an inner surface 204 and an outer surface 206. An airfoil 208 extends from the outer surface 206 in the radial direction R. The airfoil 208 extends from a root 210 to a tip (not shown). The airfoil 208 extends between an airfoil leading edge 212 and an airfoil trailing edge 213.

The yielding interface 218 extends axially between an interface leading edge 217 and an interface trailing edge 219. In one aspect the yielding interface 218 includes a tapered portion 224 that tapers from a small thickness (denoted "TS") defining a thin end 223 proximate the interface leading edge 217 toward a full thickness (denoted "TF") defining a thick end 225 of the yielding interface 218 at or near the interface trailing edge 219. A tapered base 236 extends from the small thickness TS of the tapered portion 224 proximate the interface leading edge 217 toward the full thickness TF of the tapered portion 224 proximate the interface trailing edge 219. In other words, the tapered base 236 mirrors the tapered portion 224. The tapered portion 224 can be formed from a honeycomb ribbon material or an additive matrix. The additive matrix can be an auxetic structure where when stretched, it thickens and when compressed, it shrinks. The tapered base 236 is formed from a hard metallic, a flexible dense polymer, or a hard rubber. The tapered base 236 can also have a consistent or variable durometer. A consistent durometer can be achieved by utilizing a single material, whereas a variable durometer can be achieved by a mixture of materials, including such materials as neoprene or silicone rubber or a combination of both including a transition between both materials.

Figure 7:
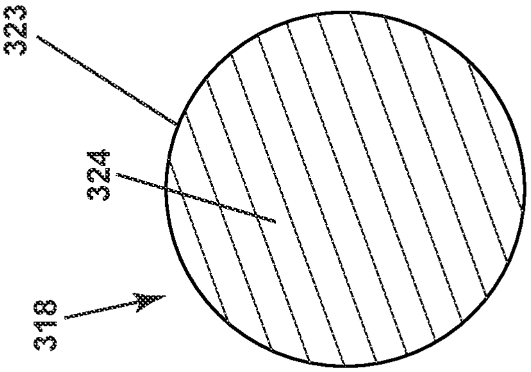
FIG. 7 is a schematic top-down sectional view of another embodiment of a yielding interface suitable for the airfoil assembly of FIG. 2 according to another aspect of the disclosure herein.

FIG. 7 is a cross-sectional top-down view of a yielding interface 318 according to another aspect of the disclosure herein. The yielding interface 318 is substantially similar to the yielding interface 118 (FIGS. 2-5), therefore, like parts will be identified with like numerals increased by 200. It should be understood that the description of the like parts of the yielding interface 118 applies to the yielding interface 318 unless otherwise noted.

In one aspect the yielding interface 318 is a disc 323 formed completely from a crushable material and defines a crushable interface 324. The crushable material can be a honeycomb ribbon material or an additive matrix. The additive matrix can be an auxetic structure where when stretched, it thickens and when compressed, it shrinks.

Figure 8:
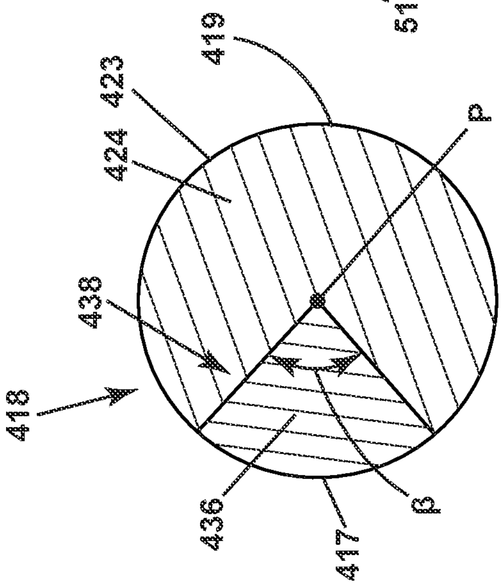
FIG. 8 is a schematic top-down sectional view of yet another embodiment of a yielding interface suitable for the airfoil assembly of FIG. 2 according to another aspect of the disclosure herein.

FIG. 8 is a cross-sectional top-down view of a yielding interface 418 according to another aspect of the disclosure herein. The yielding interface 418 is substantially similar to the yielding interface 118 (FIGS. 2-5), therefore, like parts will be identified with like numerals increased by 300. It should be understood that the description of the like parts of the yielding interface 118 applies to the yielding interface 418 unless otherwise noted.

In one aspect the yielding interface 418 is a disc 423 with over 50% of a crushable material defining a crushable interface 424. The yielding interface 418 extends axially between an interface leading edge 417 and an interface trailing edge 419. The crushable material can be distributed unevenly circumferentially. An uneven distribution 438 provides a crushable portion support for the airfoil 108 (FIG. 5) throughout the arc β. The crushable material can be a honeycomb ribbon material or an additive matrix. The additive matrix can be an auxetic structure where when stretched, it thickens and when compressed, it shrinks. In some aspects, even after the crushable material has deformed or crushed, the airfoil 108 can still rotate about the central axis CA (FIG. 2).

A similar distribution of a stiffer material in the yielding interface 318 is provided with the stiffer material proximate the interface trailing edge 419 and the more flexible crushable material proximate the interface leading edge 417. The stiffer material defines a base 436. The stiffer material can be a hard metallic, a flexible dense polymer, or hard rubber. The base 436 can also have a consistent or variable durometer. A consistent durometer can be achieved by utilizing a single material, whereas a variable durometer can be achieved by a mixture of materials, including such materials as neoprene or silicone rubber or a combination of both including a transition between both materials. In one aspect the crushable material defines 83% of the yielding interface 418 and the stiffer material defines 17% of the yielding interface. It is also contemplated that the crushable interface 424 defines an arc β of between 50° and 130°.

Figure 9:
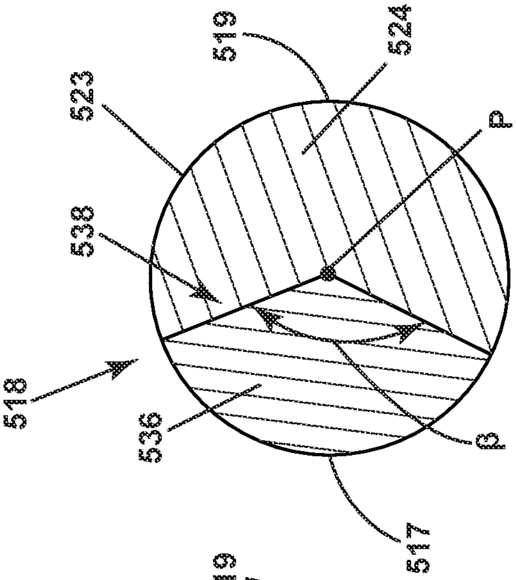
FIG. 9 is a schematic top-down sectional view of yet another embodiment of a yielding interface suitable for the airfoil assembly of FIG. 2 according to another aspect of the disclosure herein.

FIG. 9 is a cross-sectional view of a yielding interface 518 according to another aspect of the disclosure herein. The yielding interface 518 is substantially similar to the yielding interface 418 (FIG. 8), therefore, like parts will be identified with like numerals increased by 100. It should be understood that the description of the like parts of the yielding interface 418 applies to the yielding interface 518 unless otherwise noted.

In one aspect the yielding interface 518 is a disc 523 made up of a crushable material defining a crushable interface 524. The yielding interface 518 extends axially between an interface leading edge 517 and an interface trailing edge 519. The crushable material can be distributed unevenly circumferentially. An uneven distribution 538 provides a crushable portion support for the airfoil 108 (FIG. 5) throughout the arc β. The crushable material defines 67% of the yielding interface 518. A remaining portion of the yielding interface 518 is made up of a stiffer material defining a base 536. The stiffer material defines 33% of the yielding interface 518. It should be understood that the amount of crushable material vs stiffer material can vary depending on the arc β. The crushable interface 524 defines an arc β of between 20° and 160°.

Figure 10:
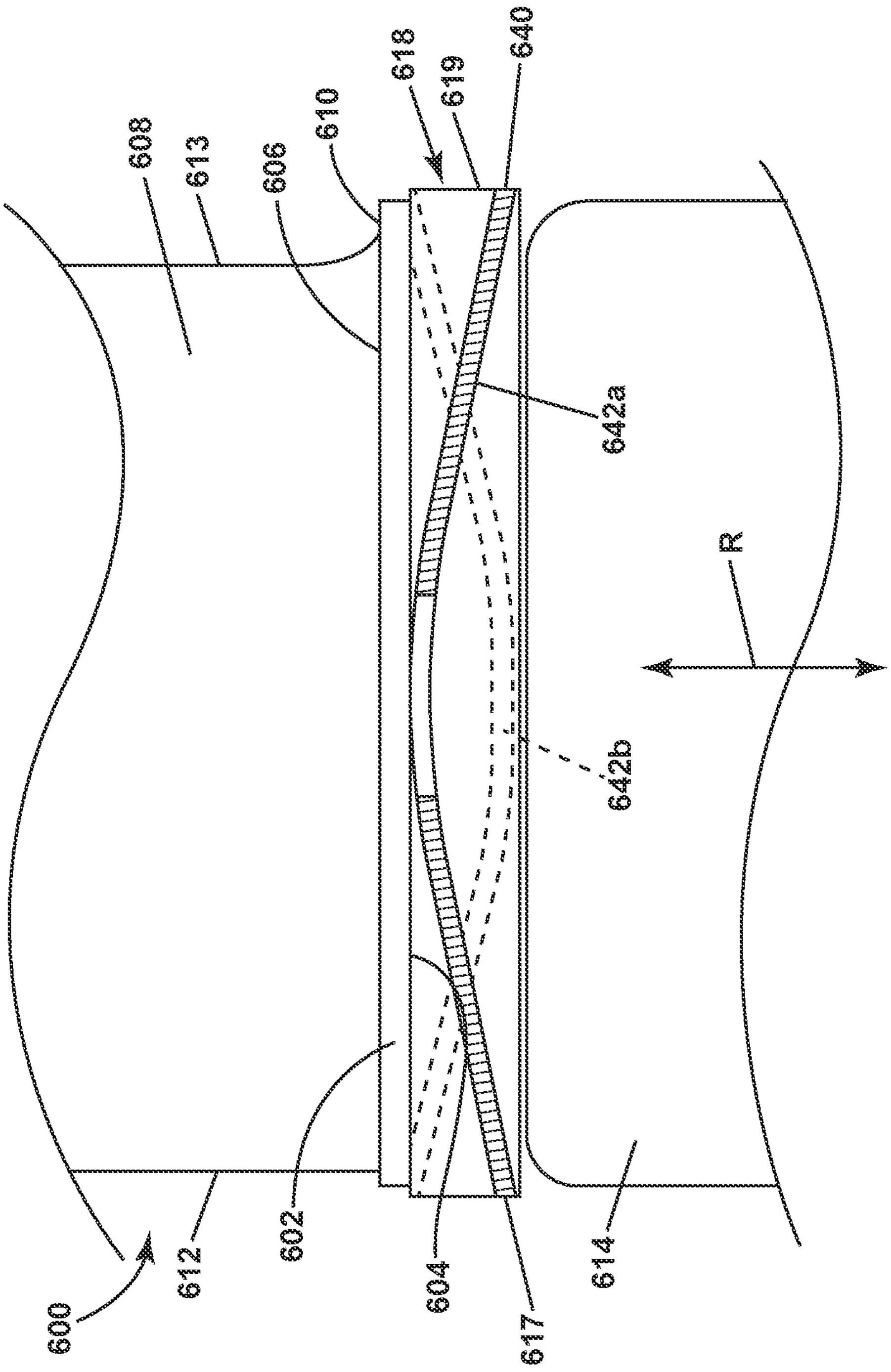
FIG. 10 is a cross-sectional view of yet another embodiment of a yielding interface suitable for the airfoil assembly of FIG. 2 according to another aspect of the disclosure herein.

FIG. 10 is a cross-sectional view of a yielding interface 618 according to another aspect of the disclosure herein. The yielding interface 618 is provided within an airfoil assembly 600 substantially similar to the airfoil assembly 100 (FIGS. 2-5), therefore, like parts will be identified with like numerals increased by 500. It should be understood that the description of the like parts of the airfoil assembly 100 applies to the airfoil assembly 600 unless otherwise noted.

The airfoil assembly 600 includes a platform 602 having an inner surface 604 and an outer surface 606. An airfoil 608 extends from the outer surface 606. The airfoil 608 extends from a root 610 to a tip (not shown). The airfoil 608 extends between an airfoil leading edge 612 and an airfoil trailing edge 613.

The yielding interface 618 extends axially between an interface leading edge 617 and an interface trailing edge 619. In one aspect the yielding interface 618 is a spring 640 compressible in the radial direction R. The spring 640 can be a Belleville washer 642*a* oriented in a first direction opening toward a mounting structure 614 of the airfoil assembly 600. In another aspect, the spring 640 is a Belleville washer 642*b* oriented in a second direction opposite the first direction and opening toward the inner surface 604 of the platform 602 of the airfoil assembly 600. The spring 640 can include any number of springs. The Belleville washer 642*a*, 642*b* can be stacked to increase or change the stiffness of the spring 640.

Figure 11:
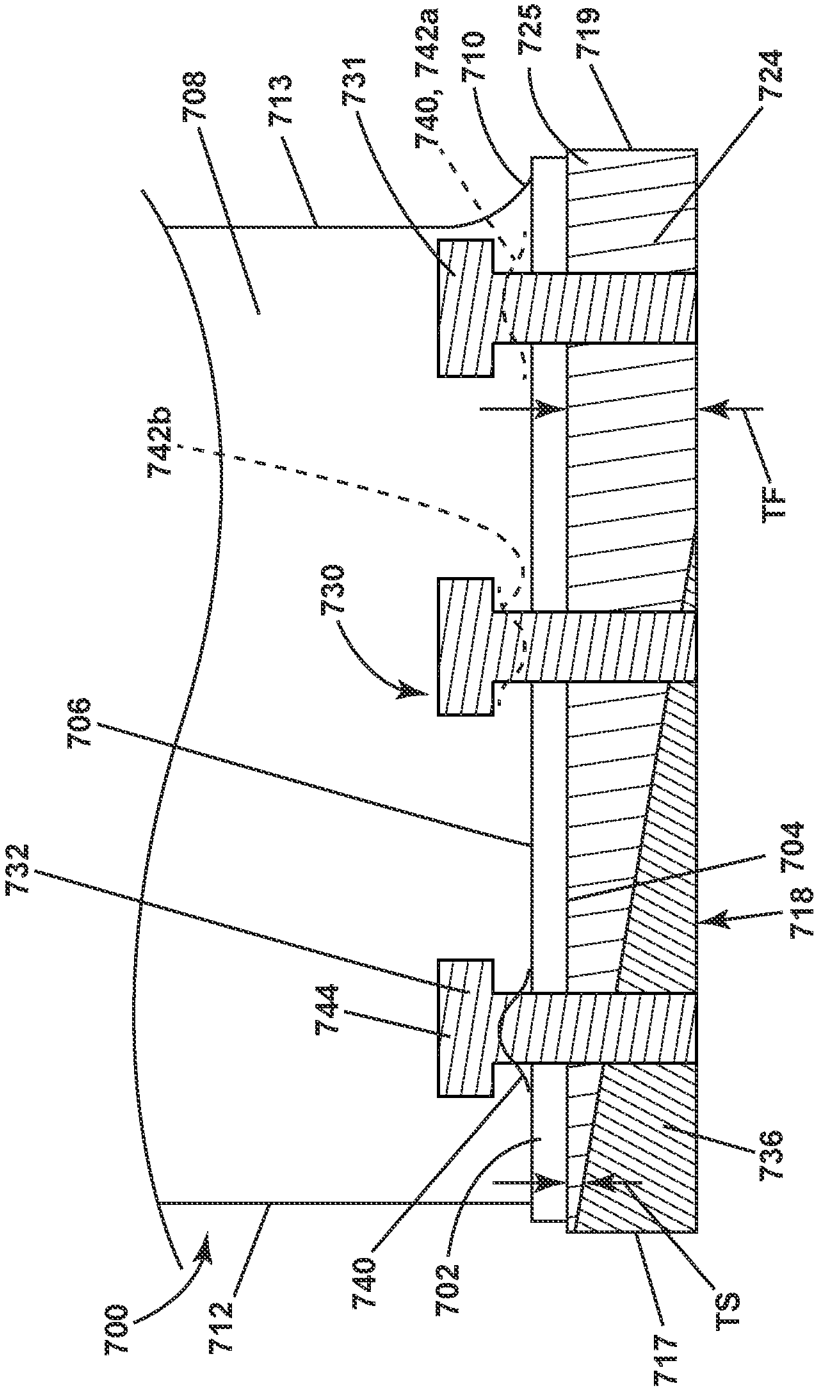
FIG. 11 is a cross-sectional view of yet another embodiment of a yielding interface, a mounting structure, and a set of bolts for mounting the mounting structure to the yielding interface according to another aspect of the disclosure herein.

FIG. 11 is a cross-sectional view of a yielding interface 718 according to yet another aspect of the disclosure herein. The yielding interface 718 is provided within an airfoil assembly 700 substantially similar to the airfoil assembly 100 (FIGS. 2-5), therefore, like parts will be identified with like numerals increased by 600. It should be understood that the description of the like parts of the airfoil assembly 100 applies to the airfoil assembly 700 unless otherwise noted.

The airfoil assembly 700 includes a platform 702 having an inner surface 704 and an outer surface 706. An airfoil 708 extends from the outer surface 706. The airfoil 708 extends from a root 710 to a tip (not shown). The airfoil 708 extends between an airfoil leading edge 712 and an airfoil trailing edge 713.

The yielding interface 718 is similar to the yielding interface 218 (FIG. 6). The yielding interface 718 extends axially between an interface leading edge 717 and an interface trailing edge 719. In one aspect the yielding interface 718 includes a tapered portion 724 that tapers from a small thickness TS proximate the interface leading edge 717 toward a full thickness TF of the yielding interface 718 at or near the interface trailing edge 719. A tapered base 736 extends from the small thickness TS proximate the interface leading edge 717 toward the full thickness TF proximate the interface trailing edge 719. In other words, the tapered base 736 mirrors the tapered portion 724. The tapered portion 724 can be formed from a honeycomb ribbon material or an additive matrix. The additive matrix can be an auxetic structure where when stretched, it thickens and when compressed, it shrinks. The tapered base 736 is formed from a hard metallic, a flexible dense polymer, or hard rubber. The tapered base 736 can also have a consistent or variable durometer. A consistent durometer can be achieved by utilizing a single material, whereas a variable durometer can be achieved by a mixture of materials, including such materials as neoprene or silicone rubber or a combination of both including a transition between both materials.

In one aspect the yielding interface 718 is affixed to the platform 702 by a set of bolts 730. At least one bolt 731 in the set of bolts 730 is located at a thick end 725 of the yielding interface 718 with at least one spring 740 located under a bolt head 744 of the at least one bolt 730. At least one bolt 732 in the set of bolts 730 includes another spring 740. The spring 740 is located between a bolt head 744 of the at least one bolt 732 and the outer surface 706 of the platform 702. The spring 740 can be a Belleville washer 742*a* oriented in a first direction opening toward the outer surface 706. In another aspect, the spring 740 is a Belleville washer 742*b* oriented in a second direction opposite the first direction and opening toward the bolt head 744. The spring 740 can include any number of springs associated with all or some of the bolts in the set of bolts 730. The Belleville washer 742*a*, 742*b* can be stacked to increase or change the stiffness of the spring 740.

Figure 12:
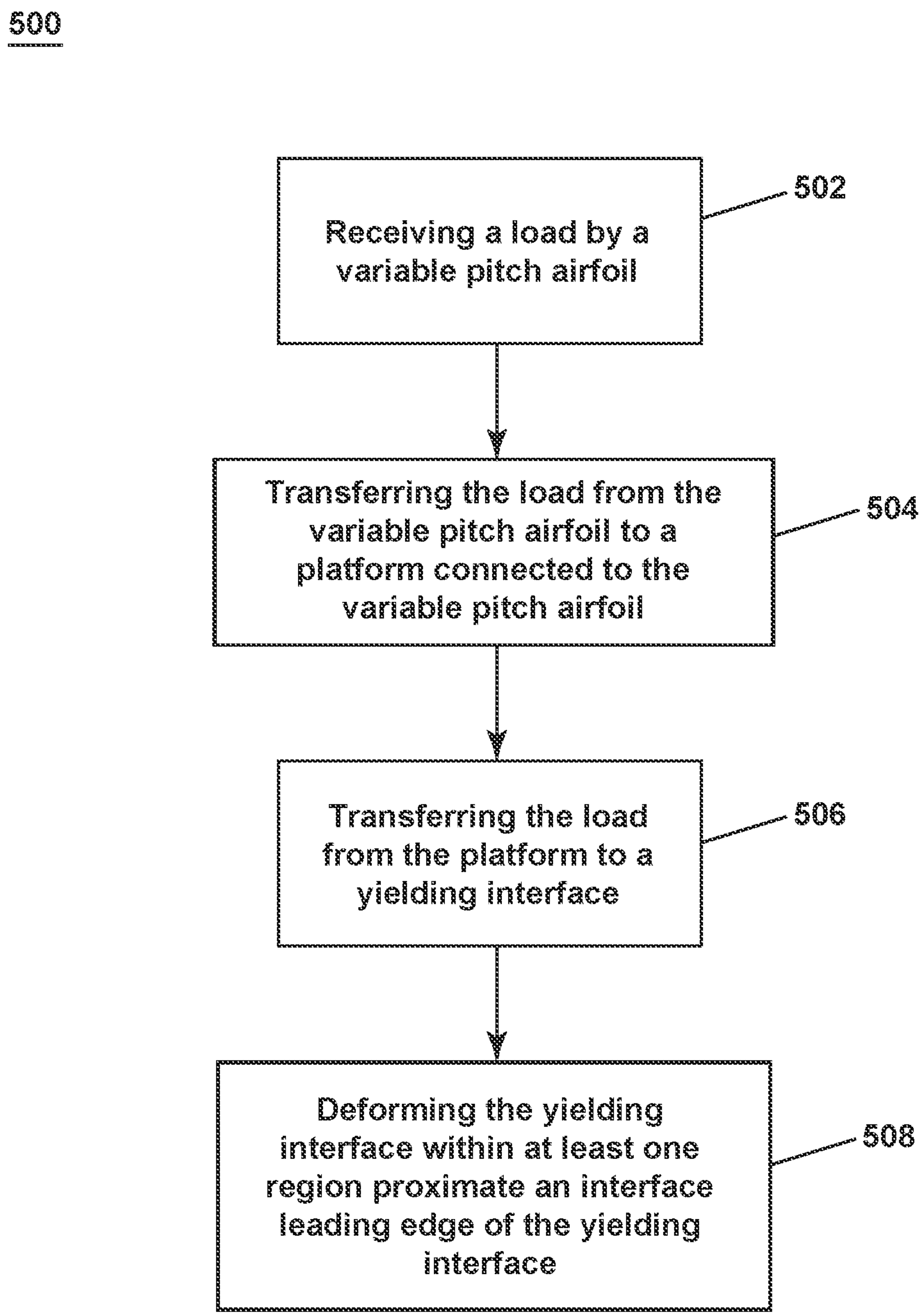
FIG. 12 is a flow chart illustrating a method of reducing a load transferred through the airfoil assembly.

Turning to FIG. 12, a flow chart illustrating a method 500 of reducing a load transfer for any of the airfoil assemblies described herein. The method 500 includes at block 502 receiving a load by the airfoil 108 (FIGS. 2-5). Further, at block 504 transferring the load from the airfoil 108 to the platform 102 (FIGS. 2-5) and in turn at block 506 from the platform 102 to the yielding interface 118 (FIGS. 2-5). The method can further include at block 508 deforming the yielding interface 118 within at least one region proximate the interface leading edge 117 (FIGS. 2-5) of the yielding interface 118. The at least one region can be the first crushable region 126*a* (FIGS. 2-5) or any region proximate the interface leading edge 117.

In one aspect the yielding interface 118 deforms elastically. Elastic deformation enables the yielding interface 118 within the at least one region proximate the interface leading edge 117 to rebound when the load has dissipated. By way of non-limiting example, the Belleville washers 642*a*, 642*b* (FIG. 10) deform and then rebound once the load has dissipated.

In another aspect the yielding interface 118 deforms inelastically. Inelastic deformation enables the yielding interface 118 to deform permanently under the load.

Benefits associated with the disclosure herein include reducing load transfer from the airfoil to the mounting structure by absorbing energy through the yielding interface. In one aspect the yielding interface is made of a honeycomb structure that is weaker than the surrounding structure and will buckle during high loading rates. In another aspect the yielding interface includes spacers in the form of crushable material or springs for any mounting bolts in order to accomplish the same load reduction.

Additional benefits include an overall weight reduction of all mounting hardware of the airfoil while still maintaining safe operation after deformation or crushing of the yielding interface occurs.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An airfoil assembly for a turbine engine, the airfoil assembly comprising a platform defining an inner surface and an outer surface; a variable pitch airfoil extending radially from the outer surface of the platform, the variable pitch airfoil extending from a root to a tip to define a span length; a mounting structure having a curved mounting surface and defining at least a portion of a hub; and a yielding interface affixed to the platform inner surface and the curved mounting surface, wherein the yielding interface provides yielding in a plurality of directions between the platform and the mounting structure.

The airfoil assembly of any preceding clause, wherein the plurality of directions is within an arc of 20° to 160°.

The airfoil assembly of any preceding clause, wherein the plurality of directions is within an arc of 50° to 130°.

The airfoil assembly of any preceding clause, wherein the variable pitch airfoil is a fixed variable pitch airfoil.

The airfoil assembly of any preceding clause, wherein the yielding interface comprises a honeycomb structure.

The airfoil assembly of any preceding clause, wherein the yielding interface comprises a spring.

The airfoil assembly of any preceding clause, wherein the spring comprises a Belleville washer.

The airfoil assembly of any preceding clause, wherein the Belleville washer is oriented in a first direction or a second direction opposite the first direction.

The airfoil assembly of any preceding clause, wherein the yielding interface comprises a crushable interface.

The airfoil assembly of any preceding clause, wherein the crushable interface comprises multiple crushable regions, each having different hardness levels.

The airfoil assembly of any preceding clause, wherein the crushable interface is a tapered portion comprising a thick end and a thin end.

The airfoil assembly of any preceding clause, wherein the airfoil is connected to the mounting structure with at least one bolt at the thick end and at least one spring is located under at least one bolt head of the at least one bolt.

The airfoil assembly of any preceding clause, wherein the yielding interface comprises a disc.

The airfoil assembly of any preceding clause, wherein the yielding interface comprises a flexible dense polymer.

The airfoil assembly of any preceding clause, wherein the yielding interface comprises a hard rubber.

The airfoil assembly of any preceding clause, wherein the airfoil is connected to the mounting structure with a set of bolts.

The airfoil assembly of any preceding clause, wherein at least one spring is located under at least one bolt head of the set of bolts.

The airfoil assembly of any preceding clause, wherein the mounting structure comprises at least one bolt hole for receiving the set of bolts, and the at least one bolt hole is chamfered.

The airfoil assembly of any preceding clause, wherein the yielding interface comprises a crushable material.

The airfoil assembly of any preceding clause, wherein the crushable material defines 67% of the yielding interface.

The airfoil assembly of any preceding clause, wherein a remaining portion of the yielding interface is made of a stiffer material defining 33% of the yielding interface.

The airfoil assembly of any preceding clause, wherein the crushable material defines 83% of the yielding interface.

The airfoil assembly of any preceding clause, wherein a remaining portion of the yielding interface is made of a stiffer material defining 17% of the yielding interface.

A method of reducing a load transferred through an airfoil assembly, the method comprising receiving a load by a variable pitch airfoil; transferring the load from the variable pitch airfoil to a platform connected to the variable pitch airfoil; transferring the load from the platform to a yielding interface; and deforming the yielding interface within at least one region proximate an interface leading edge of the yielding interface.

The method of any preceding clause, wherein the deforming comprises an elastic deformation.

The method of any preceding clause, wherein the deforming comprises an inelastic deformation.

A turbine engine for an aircraft, the turbine engine having an airfoil assembly comprising a platform defining an inner surface and an outer surface; a variable pitch airfoil extending radially from the outer surface of the platform, the variable pitch airfoil extending from a root to a tip to define a span length; a mounting structure having a curved mounting surface and defining at least a portion of a hub; and a yielding interface affixed to the platform inner surface and the curved mounting surface, wherein the yielding interface provides yielding in a plurality of directions between the platform and the mounting structure.

The turbine engine of any preceding clause, wherein the plurality of directions is within an arc of 20° to 160°.

The turbine engine of any preceding clause, wherein the plurality of directions is within an arc of 50° to 130°.

The turbine engine of any preceding clause, wherein the variable pitch airfoil is a fixed variable pitch airfoil.

The turbine engine of any preceding clause, wherein the yielding interface comprises a honeycomb structure.

The turbine engine of any preceding clause, wherein the yielding interface comprises a spring.

The turbine engine of any preceding clause, wherein the spring comprises a Belleville washer.

The turbine engine of any preceding clause, wherein the Belleville washer is oriented in a first direction or a second direction opposite the first direction.

The turbine engine of any preceding clause, wherein the yielding interface comprises a crushable interface.

The turbine engine of any preceding clause, wherein the crushable interface comprises multiple crushable regions, each having different hardness levels.

The turbine engine of any preceding clause, wherein the crushable interface is a tapered portion comprising a thick end and a thin end.

The turbine engine of any preceding clause, wherein the airfoil is connected to the mounting structure with at least one bolt at the thick end and at least one spring is located under at least one bolt head of the at least one bolt.

The turbine engine of any preceding clause, wherein the yielding interface comprises a disc.

The turbine engine of any preceding clause, wherein the yielding interface comprises a flexible dense polymer.

The turbine engine of any preceding clause, wherein the yielding interface comprises a hard rubber.

The turbine engine of any preceding clause, wherein the airfoil is connected to the mounting structure with a set of bolts.

The turbine engine of any preceding clause, wherein at least one spring is located under at least one bolt head of the set of bolts.

The turbine engine of any preceding clause, wherein the mounting structure comprises at least one bolt hole for receiving the set of bolts, and the at least one bolt hole is chamfered.

The turbine engine of any preceding clause, wherein the yielding interface comprises a crushable material.

The turbine engine of any preceding clause, wherein the crushable material defines 67% of the yielding interface.

The turbine engine of any preceding clause, wherein a remaining portion of the yielding interface is made of a stiffer material defining 33% of the yielding interface.

The turbine engine of any preceding clause, wherein the crushable material defines 83% of the yielding interface.

The turbine engine of any preceding clause, wherein a remaining portion of the yielding interface is made of a stiffer material defining 17% of the yielding interface.

What is claimed is:

1. An airfoil assembly for a turbine engine, the airfoil assembly comprising:
- a platform defining an inner surface and an outer surface;
- a variable pitch airfoil extending radially from the outer surface of the platform, the variable pitch airfoil extending from a root to a tip to define a span length;
- a mounting structure having a curved mounting surface and defining at least a portion of a hub; and
- a yielding interface affixed to the platform inner surface and the curved mounting surface, wherein the yielding interface provides yielding in a plurality of directions between the platform and the mounting structure and wherein the yielding interface includes a spring, a crushable interface, or a combination thereof.

2. The airfoil assembly of claim 1, wherein the plurality of directions is within an arc of 20° to 160°.

3. The airfoil assembly of claim 1, wherein the variable pitch airfoil is a fixed variable pitch airfoil.

4. The airfoil assembly of claim 1, wherein the yielding interface comprises a honeycomb structure.

5. The airfoil assembly of claim 1, wherein the crushable interface comprises multiple crushable regions, each having different hardness levels.

6. The airfoil assembly of claim 1, wherein the crushable interface is a tapered portion comprising a thick end and a thin end.

7. The airfoil assembly of claim 6, wherein the variable pitch airfoil is connected to the mounting structure with at least one bolt at the thick end and at least one spring is located under at least one bolt head of the at least one bolt.

8. The airfoil assembly of claim 1, wherein the yielding interface comprises a disc.

9. The airfoil assembly of claim 1, wherein the variable pitch airfoil is connected to the mounting structure with a set of bolts.

10. A method of reducing a load transferred through the airfoil assembly of claim 1, the method comprising:
- receiving a load by the variable pitch airfoil;
- transferring the load from the variable pitch airfoil to the platform connected to the variable pitch airfoil;
- transferring the load from the platform to the yielding interface; and
- deforming the yielding interface within at least one region proximate an interface leading edge of the yielding interface.

11. An airfoil assembly for a turbine engine, the airfoil assembly comprising:
- a platform defining an inner surface and an outer surface;
- a variable pitch airfoil extending radially from the outer surface of the platform, the variable pitch airfoil extending from a root to a tip to define a span length;
- a mounting structure having a curved mounting surface and defining at least a portion of a hub and wherein the variable pitch airfoil is connected to the mounting structure with a set of bolts; and
- a yielding interface affixed to the platform inner surface and the curved mounting surface, wherein the yielding interface provides yielding in a plurality of directions between the platform and the mounting structure.

12. The airfoil assembly of claim 11, wherein the yielding interface comprises a spring.

13. The airfoil assembly of claim 12, wherein the spring comprises a Belleville washer.

14. The airfoil assembly of claim 13, wherein the Belleville washer is oriented in a first direction or a second direction opposite the first direction.

15. The airfoil assembly of claim 11, wherein the yielding interface comprises a crushable interface.

16. The airfoil assembly of claim 11, wherein the yielding interface comprises a flexible dense polymer.

17. The airfoil assembly of claim 11, wherein the yielding interface comprises a hard rubber.

18. The airfoil assembly of claim 11, wherein at least one spring is located under at least one bolt head of the set of bolts.

19. The airfoil assembly of claim 11, wherein the mounting structure comprises at least one bolt hole for receiving the set of bolts, and the at least one bolt hole is chamfered.

20. A method of reducing a load transferred through the airfoil assembly of claim 11, the method comprising:

receiving a load by the variable pitch airfoil;

transferring the load from the variable pitch airfoil to the platform connected to the variable pitch airfoil;

transferring the load from the platform to the yielding interface; and deforming the yielding interface within at least one region proximate an interface leading edge of the yielding interface.

* * * * *